(12) United States Patent
Fables et al.

(10) Patent No.: US 7,630,874 B2
(45) Date of Patent: Dec. 8, 2009

(54) DATA VISUALIZATION METHODS FOR SIMULATION MODELING OF AGENT BEHAVIORAL EXPRESSION

(75) Inventors: Wylci Fables, Maui, HI (US); Jore Park, Maui, HI (US); Jonathan Colt, Maui, HI (US)

(73) Assignee: SeaSeer Research and Development LLC, Kula, Maui, HI (US)

( * ) Notice: Subject to any disclaimer, the term of this patent is extended or adjusted under 35 U.S.C. 154(b) by 0 days.

(21) Appl. No.: 11/846,426

(22) Filed: Aug. 28, 2007

(65) Prior Publication Data
US 2008/0027692 A1 Jan. 31, 2008

Related U.S. Application Data

(62) Division of application No. 10/767,509, filed on Jan. 28, 2004, now Pat. No. 7,263,474.

(51) Int. Cl.
*G06F 17/50* (2006.01)
(52) U.S. Cl. ......................................... 703/13; 717/104
(58) Field of Classification Search ................... 703/13, 703/6; 434/322, 157, 118; 345/706; 705/10, 705/36; 706/60; 707/104.1; 700/2; 717/104; 378/210; 340/573.1
See application file for complete search history.

(56) References Cited

U.S. PATENT DOCUMENTS

| | | | |
|---|---|---|---|
| 6,154,731 A | 11/2000 | Monks | |
| 6,185,534 B1 * | 2/2001 | Breese et al. | 704/270 |
| 6,216,098 B1 * | 4/2001 | Clancey et al. | 703/6 |
| 6,292,830 B1 | 9/2001 | Taylor et al. | |

(Continued)

OTHER PUBLICATIONS

Kellen E. Tsikalas, "When the Sims Get Real: an Analysis of How Digital Play Spaces Promote Learning in Low-Income, Diverse Communities" Computers for Youth, New York, New York , Oct. 1, 2001, pp. 1-12.*

(Continued)

*Primary Examiner*—Paul L Rodriguez
*Assistant Examiner*—Kandasamy Thangavelu
(74) *Attorney, Agent, or Firm*—Leighton K. Chong

(57) ABSTRACT

A computer simulation method is provided for modeling the behavioral expression of one or more agents in an environment to be simulated, then running a simulation of the modeled agent(s) against real-world information as input data reflecting changing conditions of the environment being simulated, and obtaining an output based on the modeled agent(s) response(s). The simulation method models the underlying cultural, social, and behavioral characteristics on which agent behaviors and actions are based, rather than modeling fixed rules for the agent's actions. The input data driving the simulation are constituted by real-world information reflecting the changing conditions of the environment being simulated, rather than an artificial set of predefined initial conditions which do not change over time. As a result, the simulation output of the modeled agent's responses to the input information can indicate more accurately how that type of participant in the simulated environment might respond under real-world conditions. Simulations can be run on global networks for agent types of different cultures, societies, and behaviors, with global sources of information. Simulation environments can include problems and situations in a wide range of human activity. Robust new visual tools are provided for discerning patterns and trends in the simulation data, including waveform charts, star charts, grid charts, and pole chart series.

11 Claims, 12 Drawing Sheets

Agent Data Layers and Perception

U.S. PATENT DOCUMENTS

| | | | |
|---|---|---|---|
| 6,577,906 B1* | 6/2003 | Hurtado et al. | 700/2 |
| 7,155,423 B1* | 12/2006 | Josephson et al. | 706/60 |
| 2001/0041328 A1* | 11/2001 | Fisher | 434/157 |
| 2002/0005865 A1* | 1/2002 | Hayes-Roth | 345/706 |
| 2002/0073101 A1* | 6/2002 | Stoyen | 707/104.1 |
| 2002/0169658 A1* | 11/2002 | Adler | 705/10 |
| 2003/0002631 A1* | 1/2003 | Gaddipati et al. | 378/210 |
| 2003/0091970 A1* | 5/2003 | Fast et al. | 434/322 |
| 2003/0128123 A1* | 7/2003 | Sumiya et al. | 340/573.1 |
| 2003/0167454 A1* | 9/2003 | Iordanov et al. | 717/104 |
| 2003/0207238 A1* | 11/2003 | Latzina et al. | 434/118 |
| 2003/0208429 A1* | 11/2003 | Bennett | 705/36 |

OTHER PUBLICATIONS

"Culture Formation and Its Issues in Personal Agent-Oriented Virtual Society", K. Matsuda et al, CVE-2002 ACM, Oct. 2, 2002, pp. 17-24.
"Embodied Agents for Multi-Party Dialog in Immersive Virtual Worlds", Traum et al, AAMAS '02 ACM, Jul. 15, 2002, pp. 766-773.
"Reinforcement Learning Rules in a Repeated Game", A. Bell, Computational Economics 18, p. 89-111, 2001.

* cited by examiner

DATA VISUALIZATION METHODS FOR SIMULATION MODELING OF AGENT BEHAVIORAL EXPRESSION

This divisional U.S. Patent Application claims the benefit of U.S. patent application Ser. No. 10/767,509, filed on Jan. 28, 2004, in the name of the same inventors, which issued as U.S. Pat. No. 7,263,464 on Aug. 28, 2007.

TECHNICAL FIELD

This invention generally relates to a computer simulation method, and more particularly, to a cultural simulation model for modeling culturally-specific agent behavioral expression and responses to real-world information sources and related simulation and data visualization methods. The resultant behavioral output and interaction from the simulation can then be applied where ever computer-assisted simulations of human behavior is required, including, but not limited to, sociological modeling, game generation, content creation, internet agent modeling, intranet agent modeling, and customer interaction and simulation.

BACKGROUND OF INVENTION

During the Industrial Age, the preferred models of human organization were vertically structured, hierarchical, and monolithic. Hierarchical organizational structures promoted efficient economies of scale and the effective command and control of participants within organizations. However, these organizational models have changed in the so-called Information Age, in which worldwide information networks have made, and are increasingly making, vast amounts of information available to all participants in real time, enabling them to make decisions and take actions far more quickly and adaptively than decision-making by top-down management in hierarchical organizations. The preferred models of organization in the information economy are horizontal, networked, and widely distributed. They are requiring a fundamental re-thinking and re-structuring of business, political, and societal organizations in the post-industrial era.

Networked organizations can be viewed as complex, non-linear, adaptive systems that operate by totally different assumptions and rules than hierarchical organizations. With relevant information being available simultaneously to all participants through all-pervasive channels (e.g., broadcast or publication media channels), decision making and taking action can occur locally at any point (node) of a network without having to traverse through the established levels or protocols of a hierarchical organization. A network can accommodate rapid growth in the addition of new participants simply by association with new nodes or to the nearest available contacts (connectors, pathways, qualitative state or hubs) in common or by exclusion, compare, or qualitative descriptor with other nodes. Participants who share common values, beliefs, or goals will prefer to aggregate in communities (clusters) and can link to the nodes of other communities having shared interests or desired or appropriate qualitative state. The preferential attachments of participants to common nodes, in clusters, and by links to other clusters allow information flow and decision making to traverse the network quickly by a relatively few number of links. If some clusters cease activity or are rendered inoperative, the pervasiveness of networked linkages ensures that other pathways for information and decision making through the network can be found. This provides the robustness of a network to adapt to changing conditions and circumstances.

However, obtaining relevant information about a network or other complex adaptive system has correspondingly become more difficult. Information is widely dispersed among a large number of nodes and clusters, and information from one node or cluster does not necessarily apply to or represent other nodes and clusters. In contrast to a top-down organization, it is also difficult to predict how the nodes and clusters of a network will react to new information or to changing conditions and circumstances. Informants linked to specific communities can better characterize the features of the linked participants of a community than external attempts to characterize the network in aggregate. Without being able to extract relevant information, the status, intentions, and future actions of a network or other complex adaptive system can be difficult to assess.

As an example, the information economy is having a fundamental impact worldwide on the ways that businesses market, distribute and sell products to consumers. Whereas businesses in the industrial era sought to dominate markets by amassing capital, resources, and distribution channels to sell standardized products to consumers, businesses today face a much more competitive environment in which real time information enables many new businesses to continually enter with new or customized products, and consumers to demand with ever increasing specificity the product features or services they want to purchase. This is fueled by vast amounts of financial, marketing, news, and other information made available simultaneously to businesses and consumers alike. Businesses must make quick decisions when to launch new products or customize existing products to changing consumer tastes, and consumers are become ever more informed about product features they want and comparison pricing for product offerings.

In a competitive market environment, the marketing director in each of the many competitor companies must decide whether, when, and what kind of product to bring to market based upon trying to assess what will succeed with consumers in relation to what products other companies will offer. His/her company's ultimate goal is to succeed by increasing sales for its products, yet must be careful not to launch the wrong product and lose consumer confidence, or to take on the market leader or other competitors too directly or too soon and risk being squashed. Their assessments must be made against a vast background of real-world data reflecting historical economic trends, product development timelines, consumers' changing attitudes, and ever shifting tactics and product releases by competitors. As a result, powerful computerized analysis tools have been very much in demand to assist and inform marketing decision making.

Prior attempts to use computer simulation to model complex systems like competitive markets have relied on modeling aggregate parameters of the modeled environment, such as cost of capital, interest rates, consumer spending, sales histories, seasonal adjustments, etc., then the probable responses of other companies, distributor intermediaries, and end users (purchasers) are deductively predicted using market rules culled from market informants. However, the use of deductive methods to forecast the actions of participants from aggregate parameters is, at best, an academic fiction because the participants do not all behave the same way over any extended length of time and with a plethora of diverse sources of market and product information.

Under real conditions, participants in a given environment can be expected to interpret real-world information available to them in different ways, and they will continually adapt and evolve new rules of decision making, showing no evidence of settling down to a single set of commonly observed rules for all participants in that environment. Moreover, complex systems have shown a tendency to coalesce toward unexpected "emergent" behavior that arises out of the chaotic ecology of the multitude of individual decisions and interactions, rather than a predictable behavior that can be deduced from the sum of their individual parts. New methods of modeling have had to be developed to take into account the individual behaviors and interactions of participants in order to derive inductively relevant information about the environment being modeled.

Recent attempts have been made to model complex systems by modeling the expected behavior of the individual participants (agents) in the environment, and running simulations based upon the chaotic ecology of their interactions. For example, the SWARM simulation system developed at the Santa Fe Institute provides general purpose tools for modeling multiple agents and running simulations of anything from artificial life to traffic patterns. See, "The SWARM Simulation System: A Tool for Studying Complex Systems", by C. Langton, N. Minar, and R. Burkhart, Santa Fe Institute, March 1995. While such multiagent modeling systems are better at approximating the behavior of complex systems, they have still relied on modeling individual agents according to an assumed set of behaviors or rules of interaction in response to predefined initial conditions. These existing multi-agent simulation models thus do not take into account the diverse cultural interactions, values and belief bases of perception, and the unexpected responses of participants to diverse sources of real-world information under changing conditions.

SUMMARY OF INVENTION

In accordance with the present invention, a computer simulation method is provided for modeling the behavioral expression of one or more agents in an environment to be simulated, then running a simulation of the modeled agent(s) against real-world information as input data reflecting changing conditions of the environment being simulated, and obtaining an output based on the modeled agent(s) response(s). The simulation method models the underlying cultural, social, behavioral characteristics, qualitative and emotional states, social interaction, desires, beliefs, empathy, individual nature, and/or differences in perception, reflecting complex decision-making processes on which agent behaviors and actions are based. This is in contrast and sharp distinction to standard industry practice of modeling fixed rules or process for the determining an agent's actions. This method allows the simulation to react to live and/or unanticipated data, or in a manner consistent with its construction but changing in its response as the goals, objectives or environment stimulus change. The input data driving the simulation are constituted by real-world information reflecting the changing conditions of the environment being simulated, rather than an artificial set of predefined initial conditions which do not change over time. As a result, the simulation output of the modeled agent's responses to the input information can indicate more accurately how that type of participant in the simulated environment might respond under real-world conditions. This simulation approach is referred to herein as the "cultural simulation model" or "CSM".

In one example of a basic implementation of the invention, the agent is modeled as a "point-of-view" (POV) representing any coherent type of human "behavioral expression" or "archetype" of interest. In networked organizations, and as typical of human behavior, participants tend to form preferential attachments (links) to a connector participant (node) with a strong or well-defined point of view or bias. Thus, modeling diverse point-of-view archetypes of agents for a simulated environment provides a more accurate and enduring representation of how multiple different agents (points-of-view) will respond to different real-world conditions thus enabling a human to perceive the world from a point-of-view larger than his or herself. Agents and their behavior as well as archetypical or patterned behavior can be modeled over a wide range of chosen cultural and human personality traits in a manner designed to be highly tolerant and globally inclusive as to data input, interaction and agent definition type. This data structure is referred to as "scales" herein. This method allows the inclusion of any data type enabling interaction with the real world, including text, numerical information, images, sound, environmental conditions, individual and collective personality traits, such as emotional responses of the simulated personality or group type, real-world events and occurrences through normal channels such as news and digital sensors, other agents and system components, and continuing outward to macroscopic influences, such as being part of an overall strategic plan or identifying with one or more cultures, industries, business sectors, organizations that are participating. Each generalized behavioral expression scale can be broken down for fine-grained resolution in terms of "levels" within each scale, and "degrees" within each level. Thus, agent archetypes can be defined, at least theoretically, with unlimited depth and granularity down to an individual type of person or even to archetypal "facets" of a single personality type. The extension of the method applies to cultural populations and to people in general. An unlimited number of different types of agents (e.g., leaders, followers, helpers, informants, competitors, etc.) can be modeled and stored in this data format and for comparison and use, selectively for any given simulation.

The cultural simulation model of the present invention employs real-world information as input data driving the simulation, representing changing conditions in the modeled real-world environment. For example, the input data can be drawn from actual news sources, broadcast media, communications between participants, publicly available information, and or selected information sources available to selected agents, etc. For simulation of a current or ongoing situation, input information can be supplied from real-time sources, such as news wires, news releases, actual communications, public announcements, etc. For simulation of an historical event or period, input data can be defined from sources available during a defined interval of time.

The present invention broadly encompasses selection of input data of any definable datatype, including words, images, events, gestures, and behavioral actions, etc. However, in a basic implementation of the cultural simulation model disclosed herein, the basic input data is in the form of textual data derived by parsing words, keywords and phrases in relational context within the text obtained from real-world information sources. Advanced versions would be able to accept entire languages. The agent's behavioral expression is defined in terms of word vocabulary entries representing words likely to be encountered in these sources that might influence that agent's point-of-view to varying degrees of weighting. During a simulation, the input textual data is processed for keywords and phrases matching (or corresponding) those of a word list associated with the modeling of the agent. The matched keywords are processed through the agent specific definitions of scales which together determine the agent's perception. Data layers scales of the agent's modeled behavioral expression. Matches found at a first stage are identified in scale/level/degree and processed for links to the next stage of influence, and so on until the linking of input-response influences reaches a terminating stage. The number of influence stages may be set to a predetermined number based on the desired level of simulation resolution. The behavioral expression may be analyzed for linkages or progressions between scales, referred to herein as a "progression of scales".

The invention further encompasses new data visualizing methods for converting the simulation's output of agent's responses into different visual datatypes that allow relevant information about the agent's responses to be discerned. For example, the processing of keywords of a text through an agent can be displayed in "waveform charts" showing the progression of influences through the perception layers of the agent's behavioral expression. A strong progression of influences might indicate that the modeled agent type responds strongly to certain input of real-world information.

The progression of input-response influences on the agent can also be charted on "star charts" or "grid charts" having independent axes for behavioral expression scales in relation to levels of influence. A persistent pattern of responses following the same progression of scales might indicate that the agent type is strongly influenced when exposed to certain types of information.

The agent's responses to input information can also be represented as a "pole chart series" in which the poles represent the progression of agent's responses in scales, and segment markers are placed at the levels and degrees of each scale representing the keyword "hits" of influence on the agent. The degree of influence is also shown by a left-right shift in marker position on the pole.

The cultural simulation model of the present invention thus provides for "bottom-up" multiagent simulations in which agent point-of-view archetypes may be modeled according to diverse cultural values, beliefs, and/or personal characteristics on which their behaviors and rules for taking action are likely to be based. The cultural simulation model thus simulates how an agent archetype might respond to real-world information given their underlying tenets of values, beliefs, and modes of perception including sound, vision, touch, smell and taste, and types of responses in a measurable sense as well as a qualitative sense. Simulations can be run by selecting an agent or multiple agents in a network or internet and information sources representing real-world conditions at a selected time. Simulating the responses of agent types against real-world information allows for more insightful modeling of agents, as well as the extraction of relevant information about participants in complex or real-world systems and situations. The cultural simulation model can be used for simulations of a wide range of environments, e.g., businesses, competitive markets, consumer behavior, interactive games, shopping, information navigation, economic policy, political dynamics, social networks, etc. The new data visualization methods provide robust new visual tools for discerning the responses and interactions of modeled agents in these simulations.

Other objects, features, and advantages of the present invention will be explained in the following detailed description of the invention having reference to the appended drawings:

DETAILED DESCRIPTION OF INVENTION

In the present invention, a cultural simulation model is used to develop a behavioral expression of an agent (point-of-view) archetype, and simulate that agent archetype's responses to sources of real-world information reflecting changing conditions of the environment being modeled. The agent archetype's responses are presented in new visual formats to allow relevant information to be discerned from the patterns of the responses. In the following detailed description of a preferred embodiment of the invention, a basic implementation of the cultural simulation model is described which models an agent's behavioral expression (point-of-view) in terms of keywords and phrases likely to be of interest to the agent's point-of-view from real-world information sources. During a simulation, the agent's responses to text obtained from real-world information sources are charted in certain visual formats (waveforms, star charts, grid charts, pole chart series) that allow relevant information about the agent's responses in that environment to be discerned. However, it is to be understood that the invention is not limited to this basic implementation example, but encompasses a whole range of extensions, variations, refinements, and improvements given the basic principles of the invention disclosed herein.

Figure 1:
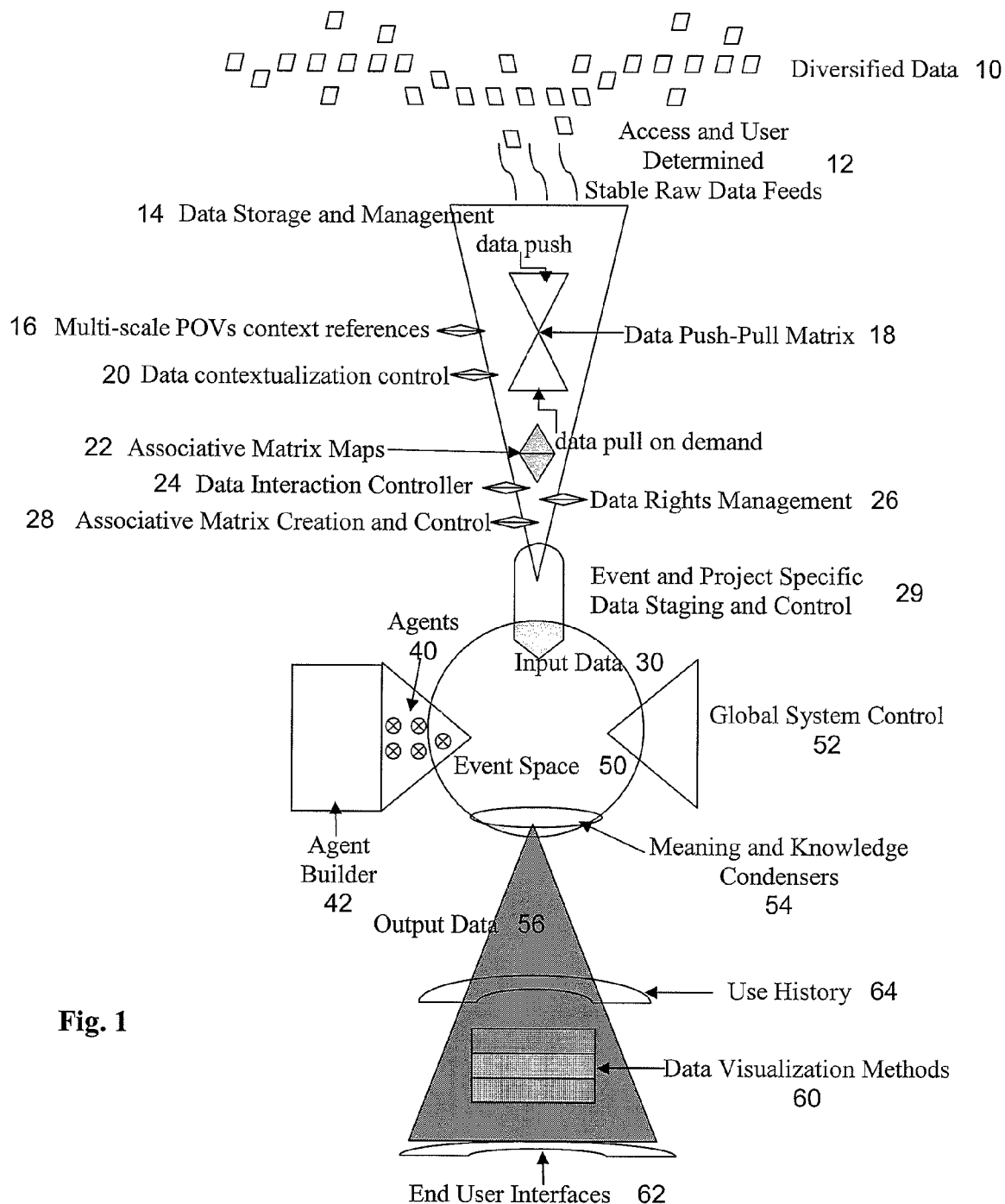
FIG. 1 is a schematic diagram showing an overall view of the cultural simulation model of the present invention.

Referring to FIG. 1, an overall view of the cultural simulation model of the present invention (referred to herein by the acronym "CSM") is depicted. Raw diversified data 10 are collected from diverse sources of real-world information, such as actual news sources, broadcast media, communications and interactions between participants or agents, available information, selected information sources available to selected agents, etc. The invention provides a new capability to run a computer simulation of a real-world system or situation using these types of real-world information sources, and preferably real-time information sources, as the input data driving the simulation. However, it is to be understood that non-real-time sources of real-world information may also be used, such as analyst reports, reviews, search data, general literature and cultural information including movies, images, sound, other perceptual data, etc. Management of the CSM determines which information sources are to be accessed and used, and stable raw data feeds 12 (text data feeds in the present implementation example) are extracted and retained via a massive data storage and management interface 14.

The selection and use of raw data feeds is moderated as a function of two controls: a created library of agent (multiscale point-of-view or POV) references 16; and a data push-pull matrix 18. In the CSM, human expert judgment is used for data contextualization control 20 in selecting which data elements keywords and phrases in the present implementation example) are likely to be of interest to a specific agent archetype that is modeled. Such expert human judgment may be supplied by experts in human psychology, finance, systems, politics, linguistics, etc. The results of such human expert judgment in data element extraction are the associative matrix maps 22 keyword vocabulary lists in the present implementation example) corresponding to each of the information sources. The creation and management of the associative matrix maps is indicated as controlled by a "sim space" data interaction controller 24. The associative matrix maps thus generated are used for the encoding of each agent's behavioral expression in terms of its response to input data elements (keywords) that are deemed likely to exert influence on that agent's point-of-view or POV (defined in the agent building process to be described in further detail below).

Each agent's behavioral expression and identification of the information sources that the agent has been modeled for are stored in the library of agent references 16, and are used to select the raw data feeds to be used in a simulation when a specific agent is selected for the simulation. The other principal data management control is the push-pull matrix 18 which uses priority mapping to balance the data push from the many diverse data sources collected for a robust CSM with the demand pull of specific sources deemed appropriate for a particular simulation environment being modeled. The push-pull matrix 18 is subject to a data rights management and use tracking control 26. Overall control of raw data collection, staging, and mapping is subject to a global associative matrix creation and maintenance control 28. When Input Data 30 of selected agent-specific data feeds are identified for use in a simulation, the data staging, bundling and availability control 29 is used to manage the ongoing functions of data access routing, data to agent push, and data search from simulation action cues.

A simulation run with the CSM occurs within an Event Space 50 which encompasses Input Data 30 and Agent(s) 40 under control of Global System Control 52. Each agent is built by an Agent Builder program 42 which manages the various functions of defining the agent design space, contextualization of the agent to the system being modeled, agent behavioral expression modeling, agent to agent interaction, and agent-specific triggers to real-world events and occurrences. The Global System Control 52 manages the various functions of maintaining a simulation process database, handling simulation system balancing and monitoring, handling game or simulation control inputs, and managing the interface for controlling running of a simulation on an external network Input Data is requested and received for processing through the one or more agents in a simulation in sequential data impulse loop interactions. The path histories of the agent's responses to the impulse loop interactions are stored.

Output Data 56 representing relevant information about the simulation are extracted by meaning and knowledge condensers 54 which are selected by the CSM management for optimizing output analysis. The Output Data 56 is displayed visually to CSM analysts through data visualization methods 60 (to be described in further detail below) which produce the desired visual displays via the end user CSM interface 62. Output Data from simulations can be stored in a use history database 64 for later retrieval and analysis.

Agent Building

In the CSM, sophisticated agents are modeled to closely emulate human behavior of known types or archetypes. The agent build process is carefully authored using expert human judgment to contextualize what archetypal features are to be encoded in the agent's behavioral expression, what real-world information is likely to influence those features and to what degree, and what response or responses that agent feature might be to such influence. An agent point-of-view maybe modeled on a particular facet of an individual personality type, such as a "leadership" facet. As a library of agent facets is generated, complex agents can be built by combining different facets of an individual personality type, e.g., a "leadership" facet can be layered with "family person" and "religious person" facets. Building complex agents may be automated using modular programming methods for combining program modules, or object-oriented programming methods for facilitating inheritance of features and type (class) definitions.

Figure 2:
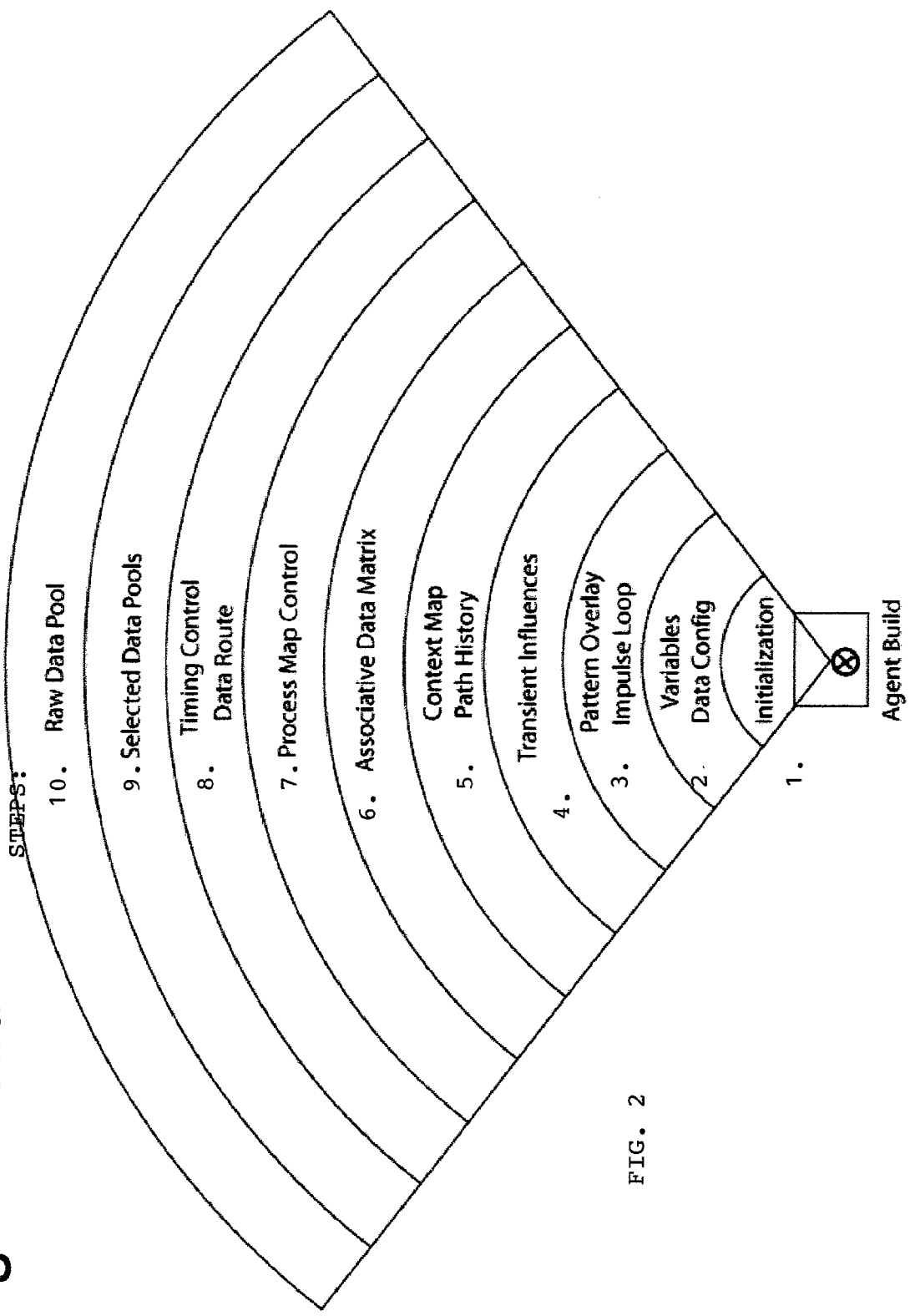
FIG. 2 is a schematic diagram showing an overview of the agent build process.

In FIG. 2, an overview of the agent build process is depicted. Step 1 starts with initialization of agent build parameters, such as agent name, agent type definition, file space, programming mode, etc. Step 2 provides for configuring the agent's simulation run-time variables and input data sources. Step 3 establishes the parameters of sending data requests and receiving data for the input data impulse loop to the agent. Step 4 allows for setting adjustments to the agent for any transient influences likely to be encountered in the sim space as the simulation environment evolves. Step 5 sets the parameters for storing a context map path history of the agent's interactions with the input data impulse loops. In Step 6, the Associative Data Matrix (keyword vocabulary lists in scale, level, and degrees in the present implementation example) for a real-world information source is accessed for data elements keywords) that are likely to influence various aspects of the agent's behavior, and the influence and weight of each data element on specific aspects of the agent's behavior and the agent's likely responses thereto are encoded. Step 7 creates a map or index of the encoded aspects of the agent's behavioral expression, which is stored for editing, reuse, etc. In Step 8, data timing and route controls for the agent are established, including the refresh rate, and data mix from different information sources. Step 9 identifies the selected input data sources the agent is being modeled for, and Step 10 identifies the overall list of raw data sources to which the agent has potential access.

Figure 3:
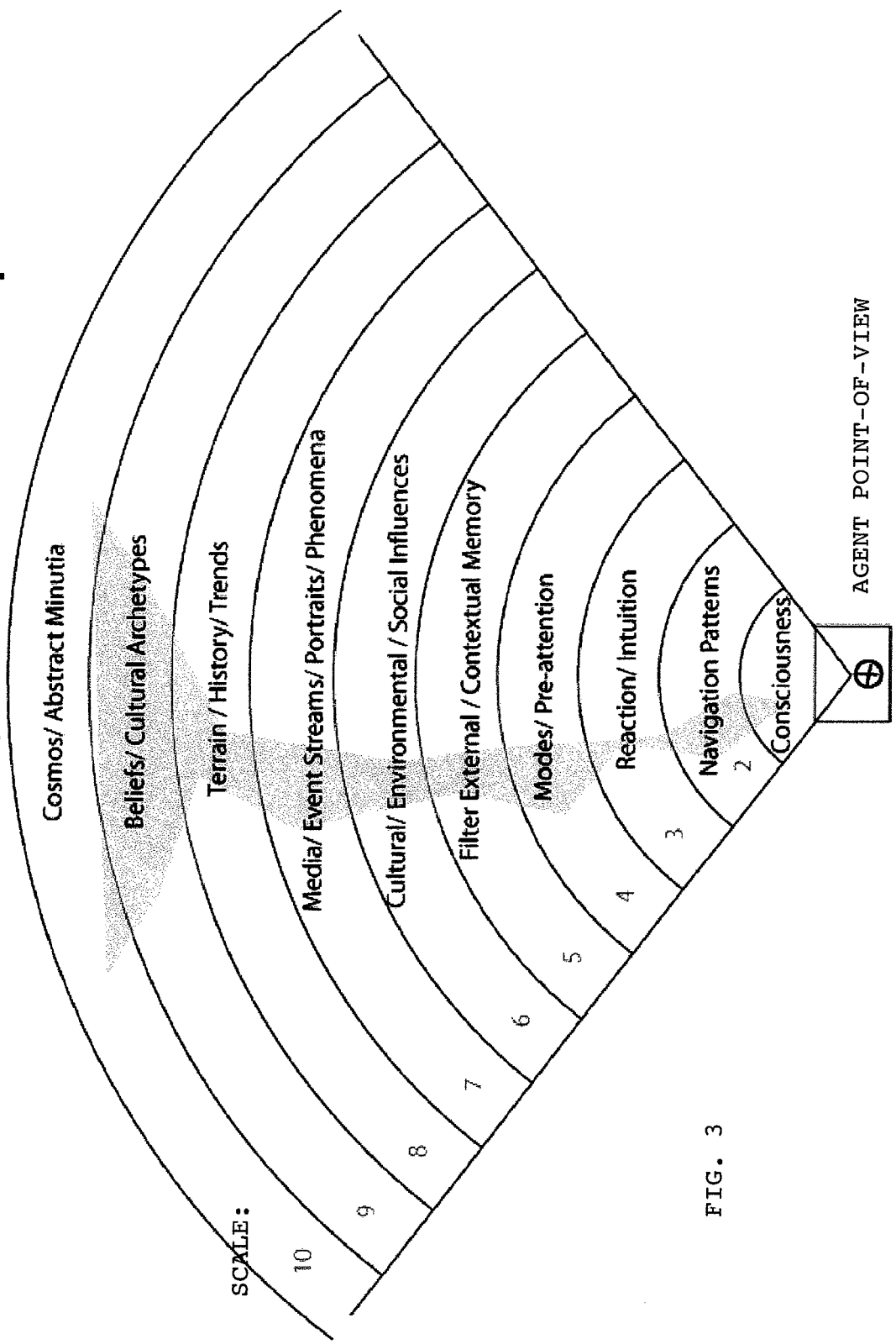
FIG. 3 is a schematic diagram illustrating the layers or scales of agent perception for which an agent maybe modeled for response to input information.

In general, common agent archetypes are deemed to be influenced by the plethora of information in the real-world (including interactions with others persons or agents) to which they are continuously exposed. A specific agent archetype responds selectively to certain real-world information sources which they have learned through experience are likely to provide information of interest. The common agent archetype filters the received information through many different modalities of perception. In this implementation example, as illustrated in FIG. 3, agent perception is modeled in ten (10) generalized "scales", which are defined in terms from most internal to most external, from the smallest to the largest, from the most temporal to the most enduring.

Scale 1 is the agent's consciousness or awareness of information. This includes biometric data as well as the focus or attention of the agent at that moment. It also includes biological memory such as DNA and the perception of commonality amongst a species. Deep psychological patterns relating to survival as well as motivational impulse, curiosity, etc., reside here.

Scale 2 is the agent's navigation patterns, the impulse to move in a particular direction as derived from an electro-chemical state of being including the emotional patterns of the agent, as well as the modes of categorizing and assigning labels to information items.

Scale 3 is the agent's actions and reactions (including emotional triggers) or intuition on a sense level to information.

Scale 4 represents the "information mulling" modes by which the agent retains a reservoir of information minutia and maintains starts associations between information items. Short term memory or influences of the moment are included as well as important long-term aspects of enduring memory plus relevant data pertaining to the current context in the sim space.

Scale 5 is the agent's employment of personal information filters and contextual memory for extracting meaning based on the agent's experience, and the roles they play. This scale represents the core sense of self by which the agent relates to the world as an external "face" or personality. This is the place where facets of behavior are most apparent.

Scale 6 is the agent's employment of culturally-based filters, environmental assumptions and conditions, and/or social influences to extract meaning from information items. This scale directly relates to agent perception, for example, of a scene and what responses the agent has to it. It equates with "pre-attention" in neurology where a person might be predisposed to see what they expect to see.

Scale 7 is the agent's learned modes of extracting meaning from externally presented information through media channels, news of events, images and portraits, current priorities, and other external phenomena, that may cause them to put medium or long term processes into effect or influence a particular response as typical. This scale is patterned behavior as determined by agents as well as socially determined types of behavior.

Scale 8 is the agent's learned or enduring knowledge of the environment he/she is involved in (the "plan" or "terrain"), its history, and its trends into the future. It also reflects society's institutions and enduring patterns that have been incorporated into the structure of the corporation, institution, or entity as the social memory and normal way of doing things Scale 9 is the agent's complex of deeply held beliefs (including religion) and cultural or archetypal values.

Scale 10 is the agent's world view or overriding ethos through which all things, from the cosmos down to abstract minutia, are perceived.

In the present example, a "scale progression" approach to agent modeling is used in which the response of the agent to information is shaped by the particular modes of perception used by that agent type as the agent builds associations through the various data layers. The agent may be the type that places most emphasis on information received from certain external channels (Scale 7), then assesses the information in terms of the organization's plan (Scale 8), compares the meaning for the plan objectives to his/her own deeply held beliefs (Scale 9), checks the plan objectives against a reservoir of collected relevant information (Scale 4), compares the indicated direction to specific personal and sphere-of-influence relationships and methods (Scale 5), and decides to act in the indicated ways to the information received Scale 3). The influence of information on the agent in one scale may be linked to influences in other scales. Interactions with other agents may be perceived through any of the layers of perception and response, allowing for different interpretations of the actions of others for each agent. An agent may also send an inquiry or message to other agents and receive feedback as additional information. A dominant mode of progression through the scales (layers) of perception of an agent leading to a response is termed the agent's archetypal "behavioral expression".

An agent's archetypal behavioral expression is formulated and encoded in the basic implementation example in terms of keywords and phrases obtained from textual data obtained from diverse real-world information sources. This text-based approach allows for efficient modeling of agents and manageable running of simulations of the CSM system on several fronts. Keywords and phrases can be reliably parsed from text obtained from real-world information sources, even for languages and writing systems that are non-alphabetic. Keywords can in an important sense be deemed "normalized" across comparable data sources by the commonly-used natural language expression for an item of information in the environment being modeled. For example, the keywords "marketing plan" has a recognized meaning among most information sources using Western and even global financial parlance, and therefore modeling an agent's response to input of these keywords has the same Scale 3 indicates that the agent is likely to respond strongly to the input information with action.

Table 1 thus represents all the entries for potential activation at each scale in the progression for this agent type, i.e., Marketing VP. Links are not shown as there is no live input data running in a simulation yet. Links from scale to scale can occur in two ways: (1) live data "stimulates" a concept at one of the scales and/or levels because of active keywords reflecting that concept, and then stimulates a concept at a different scale and/or level, thereby forging a link between the two occurrences; or (2) a human operator has decided that the two scales and levels are to be linked, taking the archetype to a finer resolution for that agent. In Table 1, neither of these two possibilities has yet occurred.

Figure 4:
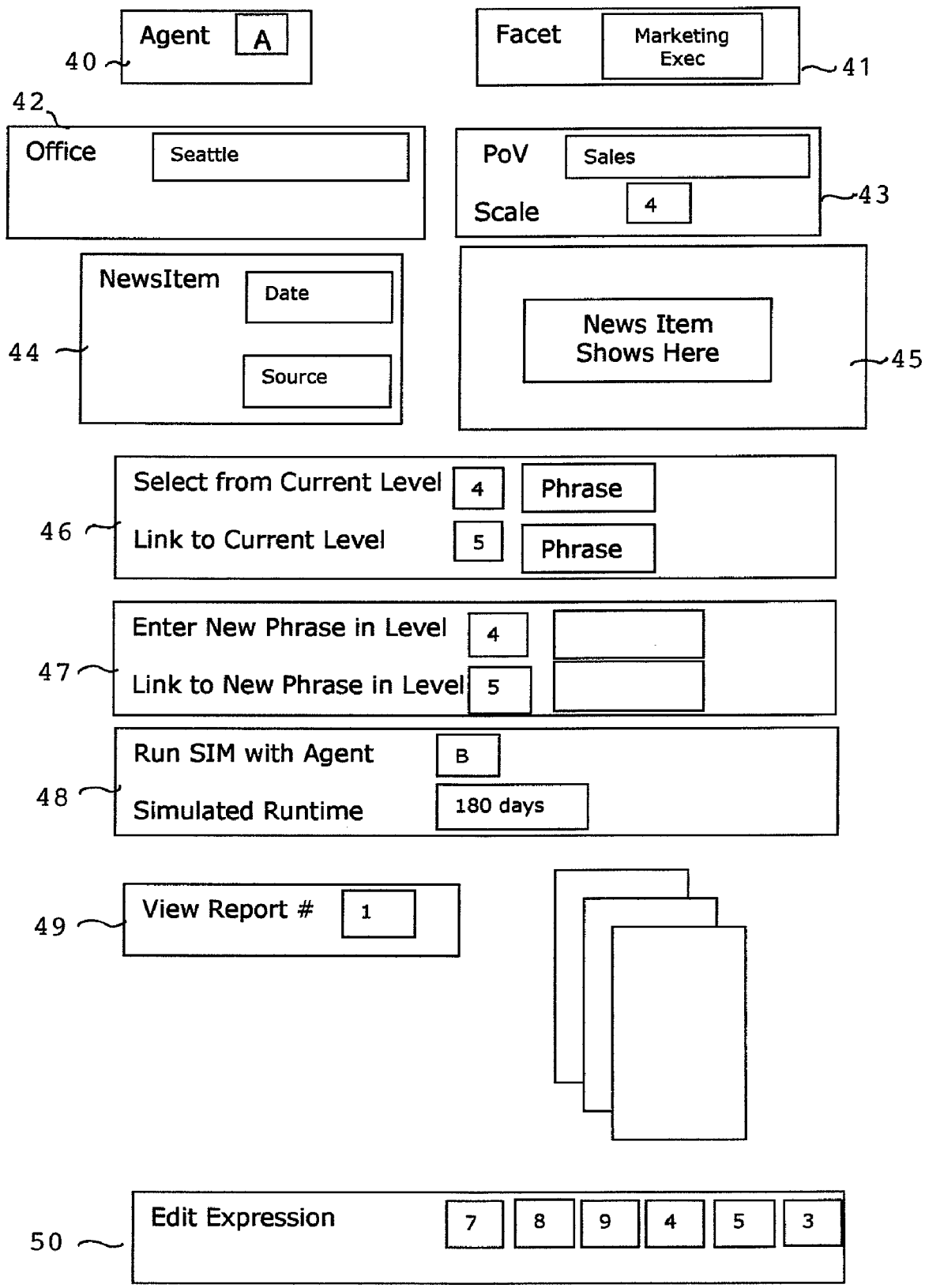
FIG. 4 is a schematic diagram illustrating an agent modeling interface to an agent building program for automating the generation of the behavioral expression of keywords and phrases.

FIG. 4 illustrates an example of an agent modeling interface to an agent building program for automating the generation of an agent's behavioral expression through keywords and phrases. Interface element 40 is used to assign an ID designation (here, "A") to the agent, and element 41 is used to assign an agent archetype or facet name, here "Marketing Exec". Element 42 indicates other agent identifying information, for example, the office or department the agent is assigned to. Element 43 indicates which scale of the behavioral expression is selected. Element 44 indicates which information source the agent is being modeled for exposure to. Element 45 is a window for displaying a sample of text from the information source from which keywords and phrases can be identified and used as entries in the agent's behavioral expression. Alternatively, an associative matrix map (keyword vocabulary list) already generated for the information source may be displayed. Element 46 allows a link from a previous Scale or Level to be established to the current Scale or Level, and Element 47 allows the user/author to enter the keywords or phrases that are linked. When an agent expression has been generated, interface element 48 allows a simulation to be run of the Agent "A" with another agent or agents and with the designated information source as Input Data for a specified period of time. Element 49 allows the user/author to view a report of the simulation, and element 50 allows the user/author to edit any of the scales of the agent's behavioral expression. Using the agent modeling interface, the user/author can extract keywords and phrases from a sample text or an associative vocabulary list, specify its link to keywords or phrases in the different scales and levels, and test the agent's response by running simulations and editing the agent expression for better accuracy.

Figure 5:
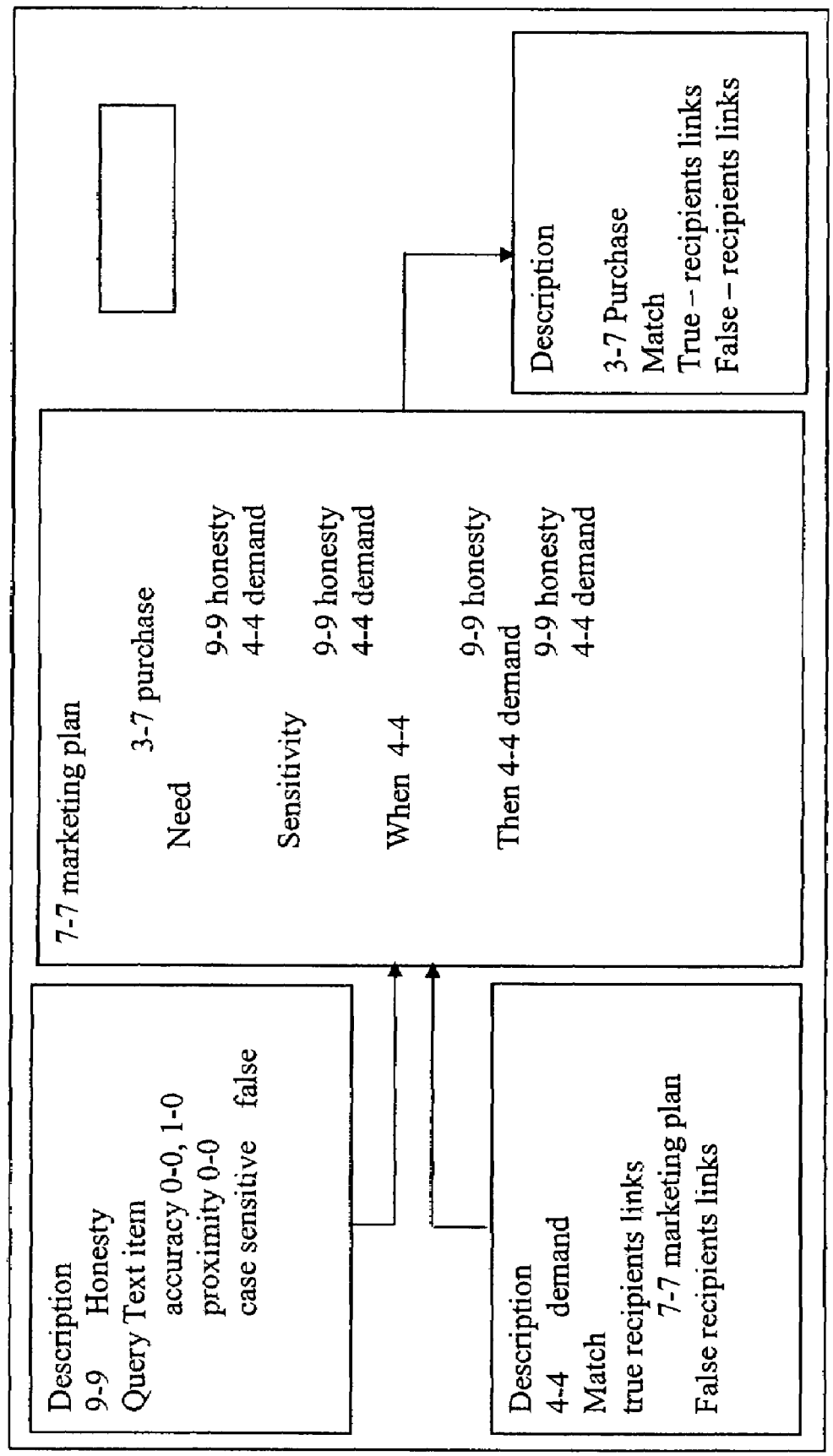
FIG. 5 is a screen shot of a windowing interface for setting weighting parameters for links between keywords and phrases in the scales or levels of an agent behavioral expression.

FIG. 5 shows an example of a graphical interface for setting weighting parameters for links between keywords and phrases in the scales or levels of an agent's behavioral expression. In the lower left dialog box, the receipt of the keyword "demand" is shown to be "true" linked to the keyword "marketing plan". In the upper left dialog box, the settings for matching the keyword "honesty" is shown to have settings for "accuracy" (0.0-1.0), "proximity" (0.0), "case sensitivity" (false), etc. "Accuracy" represents the sensitivity of the search, i.e., whether it is "direct" or "fuzzy". "Proximity" is used when there is more than one word in a search phrase to indicate how close the words must be together for a match to occur. In the middle box, the keyword "marketing plan" is specified in terms of parameters "need", "sensitivity", and preceding and subsequent links. The section labeled "need" shows what threshold for the number of matches will begin the time range during simulation (this parameter is not shown as set in diagram). The section labeled "sensitivity" allows for adjusting the sensitivity to tune it for a particular live data source (this parameter is not shown as set in diagram). The section labeled "when" shows the controls for setting the length of time (time range) during which a match must occur to trigger the link This section also shows that if the keyword "honesty" occurs at all (no threshold is set), and demand reaches a small threshold, then a link to the keyword "purchase" will occur. The section labeled "then" provides a control for setting a threshold of matches that should occur before the end of the target time range. If conditions are met, a waveform for the matches obtained is performed. The target type of waveforms to be matched during simulation can be specified (simulations and waveform outputs are discussed below). Finally, the lower right dialog box is labeled "purchase" and shows no recipients for messages from this link have been set as yet.

Responses of the agent's behavioral expression to input data may be implemented in a wide range of ways besides direct keyword matching. The responses may also be implemented as indirect matching, partial matching, weighted matching, qualitative response, quantitative but "fuzzy" response, a boolean or other logic function of a quantitative response, etc.

An agent's behavioral expression can also include links to other agents, generally in the form of messaging from one agent to another. For example, if a keyword influence on an agent evokes a response to send a message to another agent, the link from the keyword entry in the given scale can point to another agent. The simulation program then generates the message specified by the link and sends it as input data to be processed by the designated agent. Besides representing human types, agents can also be constructed to represent an event, agency, organization, resource, defined policy or plan, or other "point-of-view". When exposed to input data representing current real-world conditions, the response elicited from such an agent may be the type of response one would expect from its real-world equivalent. In this manner, agents can be modeled to represent other diverse elements that would be expected to have an influence on simulations of real-world problems or situations along with the selected human types.

Since agent expression in the basic implementation example is encoded as entries of keywords of a natural language, it can be formulated by a layperson without computer program skills using the agent building interface. The agent-building authors would be expected to have a high degree of cultural and human behavioral knowledge, such as psychologists, linguists, historians, etc., so that more sophisticated agent expressions can be built with more complex personalities approximating their human archetypes. The experts' knowledge of cultural, behavioral, and personality tenets of human types can thus be modeled in the CSM and used for simulations. The accumulation of expert knowledge serves to train and evolve the system to a high degree of sophistication.

Running Simulations

Figure 6:
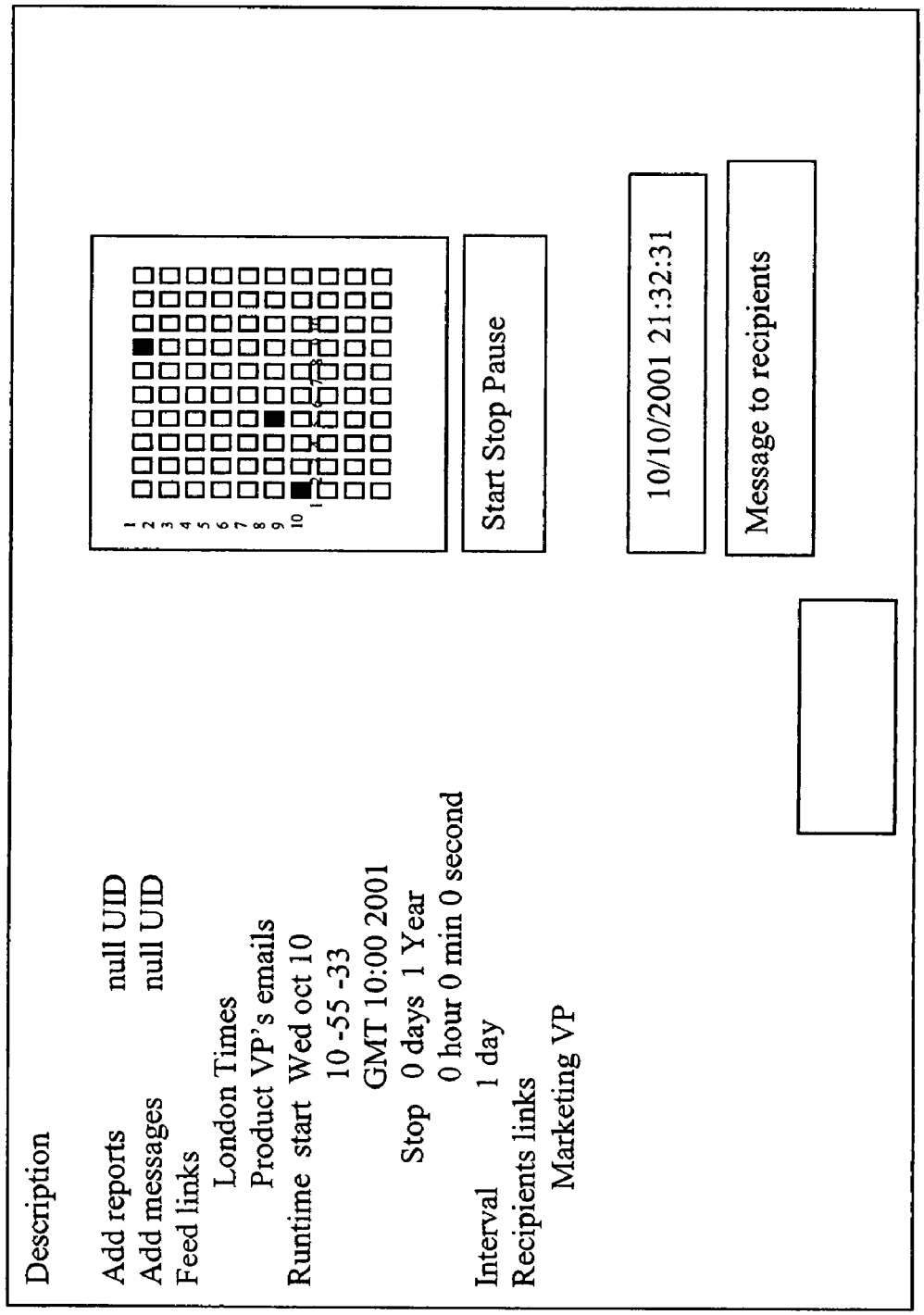
FIG. 6 is a screen shot illustrating a simplified simulation control interface for the cultural simulation model.

As libraries of agent expressions are developed, the CSM can run a wide range of simulations, from testing the response of a single agent type to an information source, to combining multiple agents in a network and exposing them to multiple sources of information. FIG. 6 illustrates a simplified simulation control interface having controls (on the left side) for allowing selection of "recipient links" (i.e., agents, here the Marketing VP), "feed links" (i.e., input data sources, here the London Times and agent emails), "runtime" and "interval" for the data feeds, messaging types, and output reports. Window 60 is a grid chart display of simulation output which is illuminated with "hits" of input text in the scales and levels of the agent. Bar displays for runtime and system messages are also provided.

The Raw Data pools of textual data used by the CSM are of two distinct types, i.e., data representing live or current information and events, and enduring data. Live data can be obtained from current news wires, online data feeds, media broadcasts, live events, human actions, etc. Enduring data can be obtained from historical and culturally specific records, publications, and archives. The textual data can be extracted as raw text using commonly available tools for text extraction, such as for standard word processing files, HTML files, portable document files (pdf), etc. Such text extraction tools are well known to those skilled in this field, and are not described in further detail herein. The Raw Data pools of textual data are stored by the CSM indexed by source, subject matter, date, and time.

When a simulation is run, the raw text data from the selected information sources, dates, and time intervals are retrieved from the CSM database and fed as Input Data along with the associative matrix maps (keyword vocabulary lists) for the agent(s) selected for the simulation. The raw text data are parsed for matches to the agent keyword lists. Text parsing and matching tools are well known to those skilled in this field, and are not described in further detail herein. The identified keywords are processed through the perception layers of the agent's modeled behavioral expression. If multiple agents are in the simulation, processing through each of the agents' progression of perceptual scales is executed in sequential execution steps with each impulse loop of input data. Any linkages, interactions, or messaging between agents specified in their behavioral expression are also processed in sequential execution steps. The path history of identified keywords and weighted values through the agent layers for each selected information source are stored for later analysis or reporting, and may also be displayed to the operator in various types of displays during the simulation.

FIG. 6 is a screen shot illustrating a simplified simulation control interface for monitoring the cultural simulation. Note that the input feeds are "London Times" and "Product VP's Emails". The runtime start, stop, and interval for refreshing the data feeds are noted. The "recipient links", i.e., the agent behavioral expression being simulated, is "Marketing VP". The graph 60 tracks the linkage "hits" that are noted during the simulation.

Simulation Data Visualization Methods

Figure 7:
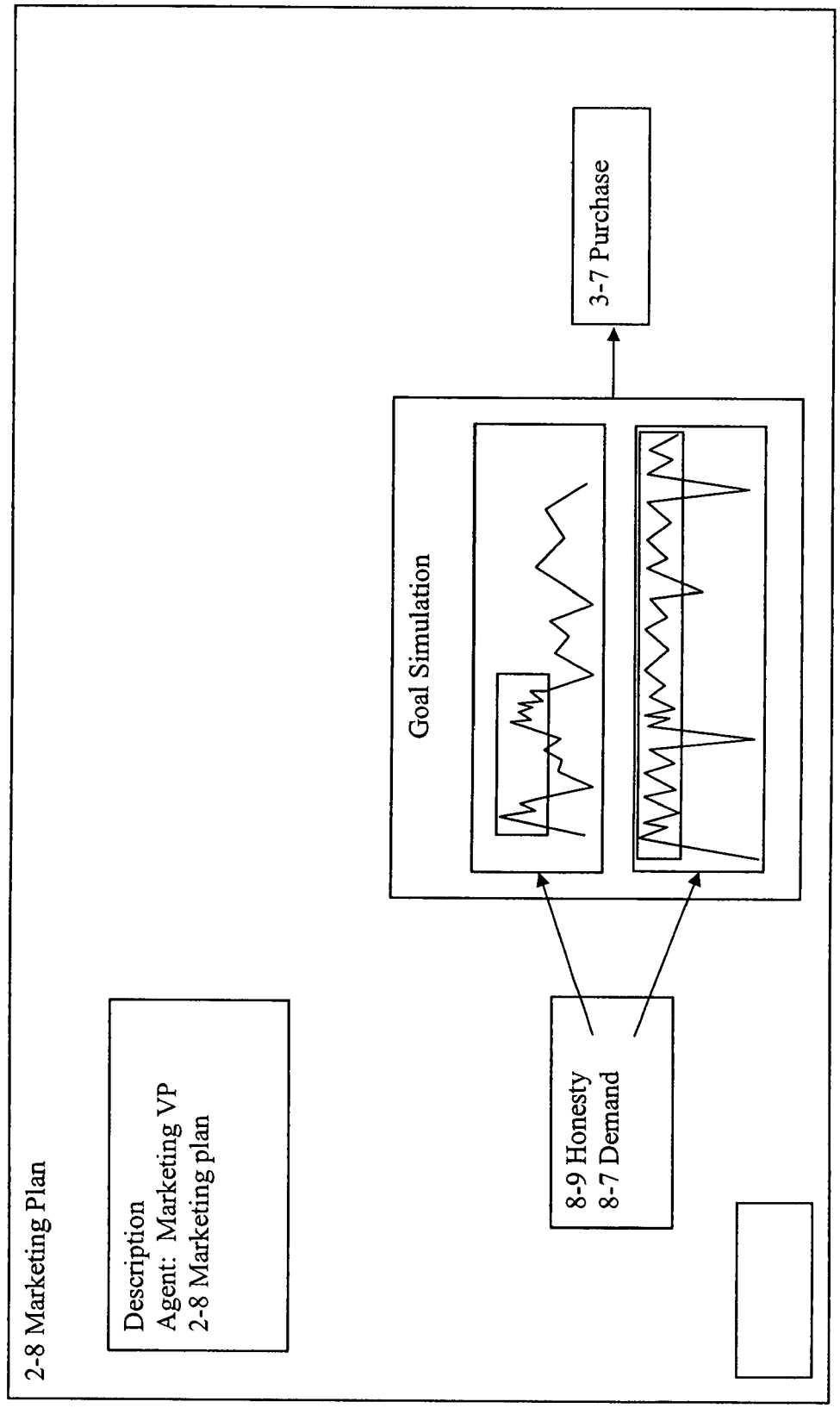
FIG. 7 is a screen shot illustrating a waveform chart for displaying the processing of keywords of an input text through an agent expression.

The invention provides new data visualizing methods allowing simulation data representing the paths and/or patterns of input data through the progression of scales of agent's expression to be viewed. One novel type of visual display illustrated in FIG. 7 shows the processing of keywords of a text through an agent in time sequence in "waveform charts". In the example shown, the presence of the keyword "honesty" linked to "marketing plan" is shown in the upper waveform is as exceeding the selected influence threshold of 0.43% through the scales of the agent's expression, as does the link from "marketing plan" to the keyword "purchase". The absence of a link from the keyword "demand" to "marketing plan" and then to "purchase" is shown in the lower waveforms as having influence exceeding the 99.9% threshold. Thus, the waveform display allows the pronounced influence of the keyword "honesty" and absence of the keyword "demand" on "marketing plan" and "purchase" to be readily discerned by the viewer.

Figure 8:
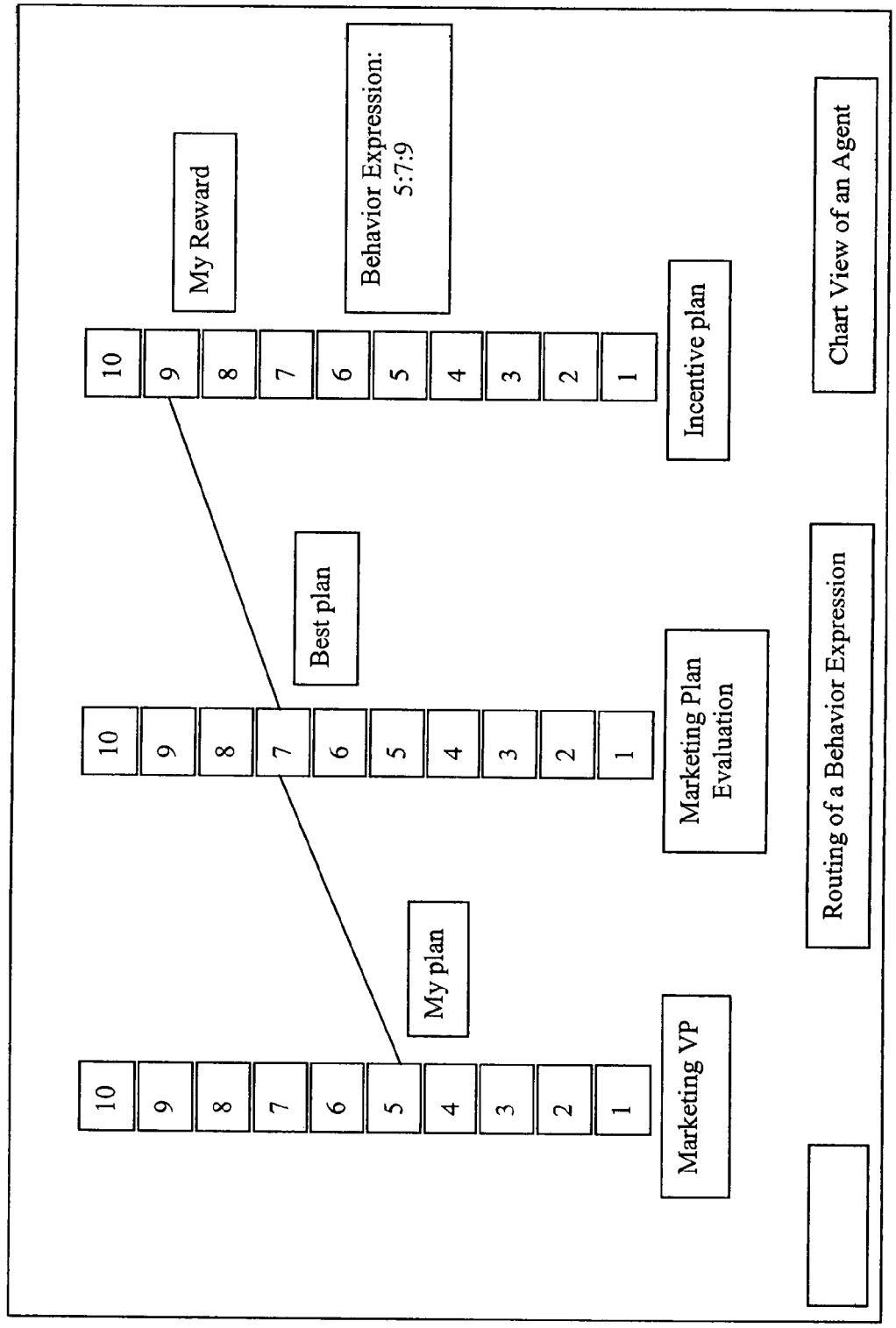
FIG. 8 is a screen shot illustrating a star chart for displaying the patterns of scale progression for an agent expression in response to an input text.

The progression of input-response influences on the perceptual scales of the agent can also be charted on "star (radial) charts" or "grid charts" having independent axes for behavioral expression scales in relation to the degree of influence. A star chart is illustrated in FIG. 8 in which the scale of keyword occurrence(s) is arranged in incremental angular positions from "10" to "1" in the counter-clockwise direction, and the degree of influence is arranged in ascending order on incremental radial positions. At the point of each occurrence the display element shows a number representing the number of occurrences at that position. The path from a previous scale and to a subsequent scale is indicated by entry and exit lines to and from each point position. The display axes are not time-dependent. Change over time is captured by the increasing count and tracings of the paths of keyword "hits" through the agent expression. Clicking on a point position results in a drop-down display of the keyword(s) found at that position. This type of display allows the user to discern whether there are any persistent patterns of scale progression that recur for an agent expression in response to an input text. A persistent pattern of responses following the same progression of scales might indicate that the agent type is strongly influenced and motivated to take action when exposed to that information. For example, a recurring influence response pattern for the Marketing VP in response to company communications might indicate that the Marketing VP type is strongly influenced by management directives to take action on a new marketing plan.

Figure 9:
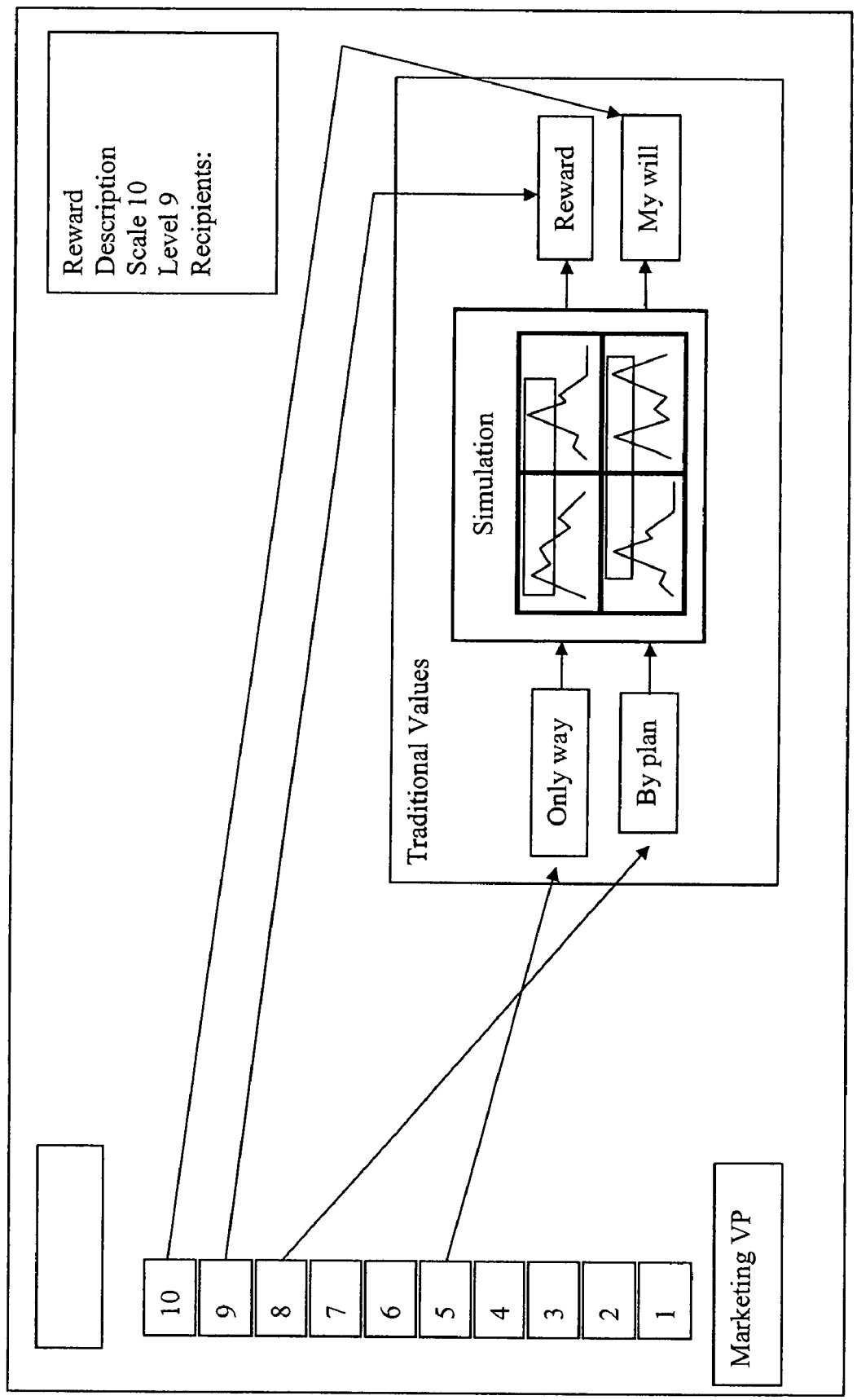
FIG. 9 is a screen shot illustrating a grid chart for displaying the patterns of scale progression for an agent expression in response to an input text.
Figure 10:
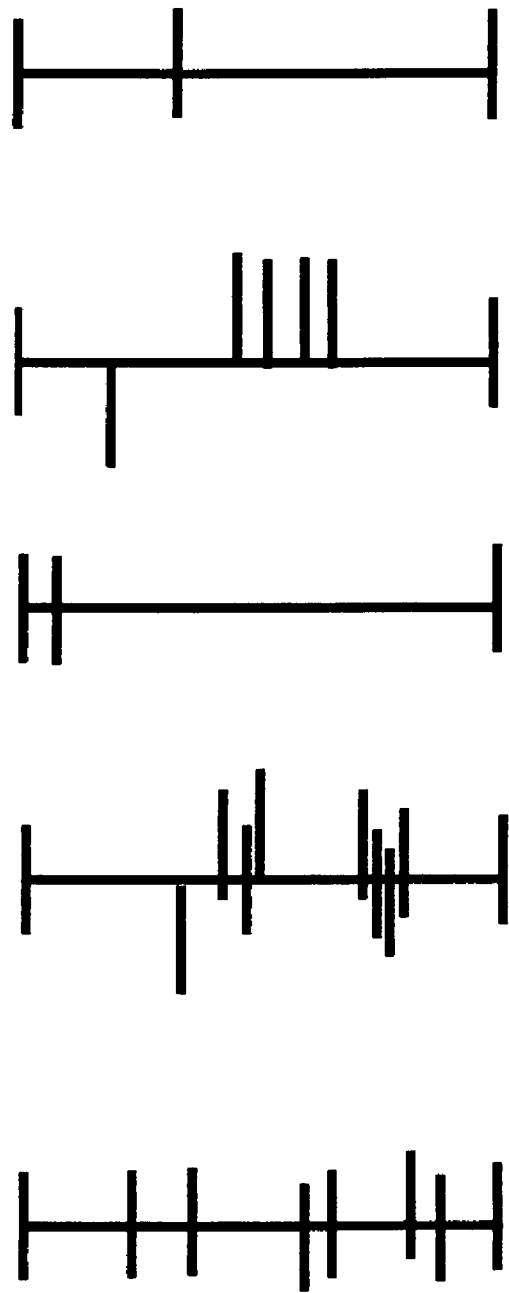
FIG. 10 is a diagram of a pole chart series for displaying the keyword "hits" for an agent expression in response to an input text.

A related type of visual display of progression of keyword "hits" through the scales of the agent's expression is the "grid chart" illustrated in FIG. 9. In the grid chart display, the Scale of agent expression is on the horizontal axis and the Level of influence is on the vertical axis. Again, the number of occurrences of keyword "hits" is shown at each displayed point position. The path from a previous scale and to a subsequent scale is indicated by entry and exit lines to and from each point position. Clicking on a point position results in a drop-down display of the keyword(s) found at that position. Further clicking on one of a displayed keyword opens a window 90 that shows the underlying waveform data. As with the star chart, this type of display allows the user to discern any persistent patterns of scale progression that recur for an agent expression in response to an input text. The user indicates which waveform or part of a waveform they want to see by defining with a bounding box in this implementation. A detail of that waveform may be shown by opening up another window that displays the actually matches, and the source of the data for the match.

Figure 11:
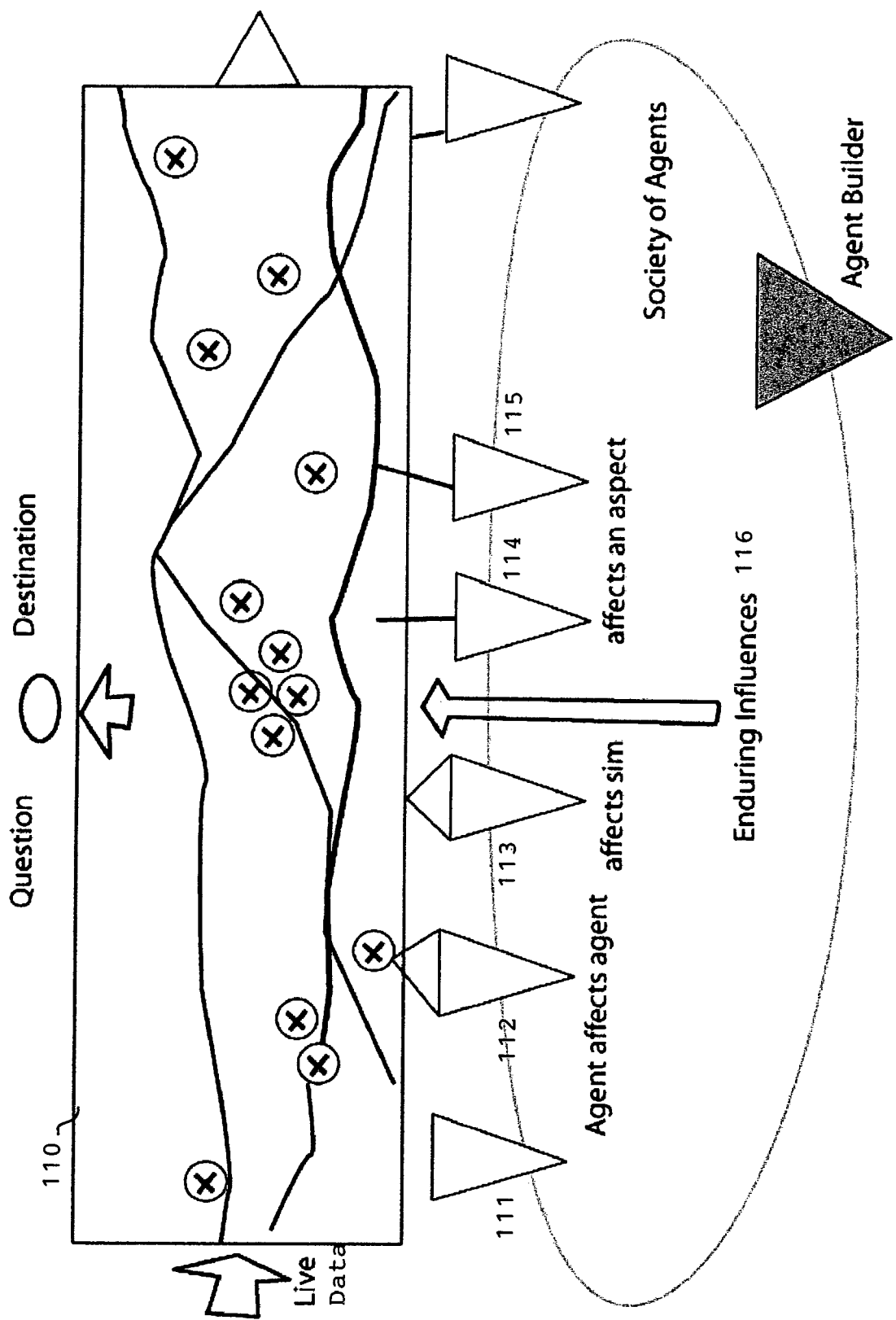
FIG. 11 is a diagram illustrating a simulation run with a society of agents using live data.

Another useful simulation data visualization method is a "pole chart series", an example of which is shown in FIG. 11. In this display, a series of poles are designated representing the progression of scales of a dominant mode of agent's expression (or selected as of interest). In this example, the poles are designated as Scales 7:8:9:2:3. Segment markers are placed at graded levels of each scale pole representing the keyword "hits" on the agent for a given input text. The degree of influence of each keyword is represented by the left-right shift of the marker position horizontally on the vertical pole. Repeated hits may be counted and noted by a number placed adjacent a marker.

In the example shown, the series of poles progresses from responses to the input sources in Scale 7, linked to company goals in Scale 8, to values and beliefs in Scale 9, to thought patterns in Scale 2, and to actions in Scale 3. The wide distribution of markers at Scale 7 indicates access to diverse information sources. The clustering of markers at Scale 8 indicates two dominant patterns of perception of company goals. The single, high-level marker at Scale 9 indicates a single dominant mode of belief perception. A cluster of markers at Scale 2 weighted in degree toward the "active" (right-hand) side indicates a strong pattern of association to those perceptual levels. A marker at a single position at Scale 3 indicates the agent's influence toward one type of action. The pole chart series thus allows a dominant mode of agent expression to be discerned visually. The potential combinations of any given number of markers in the present example utilizing 10 scales at 10 graded levels and 10 degrees number in the billions, thereby providing virtually unlimited resolving power up to ultimately identifying diverse human types in diverse cultures across large human populations. The pole chart format is also distinct and time-invariant as to be machine readable, much like "DNA" markers. The marker's vertical position indicates the level which is an increase of 10× resolution to the scale. A horizontal shift of the marker indicates the degree of the "hit" within that level, providing a further detailed resolution of 10× over the level. Any number of keywords or keyword combinations may indicate "hits" aggregated at the same position. This type of chart thus illustrates the pattern of "hits" in terms of pattern of scale/level/degree (with 1000× resolution), rather than on specific keyword matches. It thus provides a measure of abstraction which can serve as a basis for analyzing resulting pole chart patterns for matching in agent types or cultural effects on agent behaviors.

Simulations can be run involving a "society" or "network" of agents, for example, to model the responses of a distributed, networked organization to real-world information. As illustrated diagrammatically in FIG. 11, a society of agents are selected to simulate their interactions and responses to answer a "Question" or point to a "Destination" as to how the society would act given certain assumptions of the "environment" or "terrain matrix" 110 and real-world information supplied as "Live Data". The agents are indicated by the circled "X"s on the terrain matrix 110. The agents have been modeled with the Agent Builder as previously described. Some agents, indicated by the expression 111, may interact and act with other agents, indicated by the expressions 112 or 113 providing feedback messages, or information into the sim space. Assumptions about conditions defining or affecting the terrain may be entered in the matrix by agents 114 or 115 affecting an aspect of the terrain, artificial agents representing enduring influences 116, or by enduring data fed in with the "Live Data". Such a simulation could answer questions like, "What type of agent is likely to take a certain action?, or "How will the agents interact with each other and their environment to arrive at a decision on taking action?

When a simulation is run, the user view the results of the simulation in a variety of ways. For example, the specific links may be shown between keywords in a path that points toward a keyword representing a goal. If the user is interested in agent activity comparisons, visualizations of detailed charts such as pole charts can display the active keywords in each agent that contributed to a series of links that have arrived at a destination or goal. In this way, a unique path through links may occur with only one agent or any society (group) of agents that have together contributed to a path that achieved a goal or destination (the terminating keyword on the path).

Figure 12:
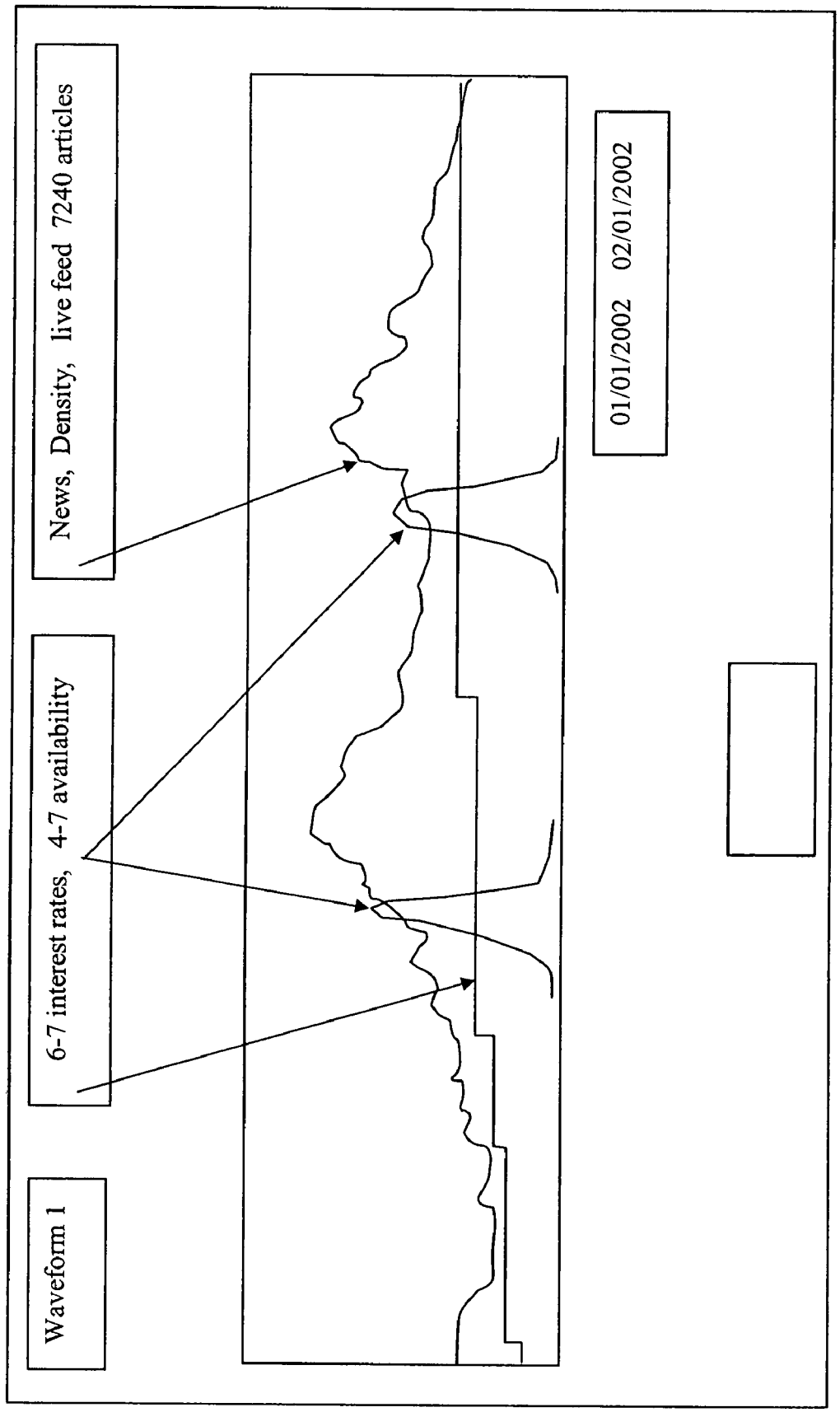
FIG. 12 illustrates another type of simulation data visualization method in waveform view showing the distribution of keyword "hits" obtained by an agent behavioral expression to text articles in a simulation over time.

FIG. 12 illustrates another type of simulation data visualization method which may provide a useful analytical tool. In this Waveform View, the distribution of "hits" over time is shown. In this example, the live input data feed is 7240 articles over several years, and high peaks pointing to the keywords "interest rates" linked to "availability" are shown in the period Jan. 1, 2002 to Feb. 1, 2002. There are many other types and methods of simulation output data visualizations that can be generated from the use of agent behavioral expression modeling in scales/levels/degrees run against live input data from various sources, data types, time frames, etc.

The running of sophisticated simulations allow models of diverse networked organizations and other complex adaptive systems to widespread information sources to be tested for likely responses. This is especially needed in modeling social networks that are mobile and distributed where individuals have interweaving rationales and choices for taking action that are not dictated in a static hierarchy. Agents are modeled upon the more enduring, underlying tenets of their worldviews, cultural values, beliefs, personalities, and archetypal modes of behavior, rather than any assumed sets of artificial rules for decision making. Its use of real-world information as input driving the simulations approximates real-world conditions in which information, interactions, and events are constantly changing. The structure of the CSM tool thus incorporates similar conditions of operation as the problems it attempts to model, and can thereby facilitate the extraction of relevant information about the responses of networks and other complex systems to complex events within a time sensitive context.

Network Deployment of Cultural Simulation Model

A major feature of the CSM is its ability to run simulations with selectable societies of agents of diverse cultural, social, and behavioral types, with changing real-world conditions, and driven by diverse and ever-changing real-world or even real-time information sources. Information worldwide is increasingly being tied to and shared on networks which are themselves linked by global networks. CSM simulations can be run on a global network by deploying interface agents at each node of the global network to perform data mining, extraction, and conversion functions to supply raw data usable by the CSM. The node interfaces ideally should take the form of autonomous web-bots that can be remotely deployed with each of the nodes and perform their data-gathering functions remotely and autonomously without needing to be synchronously controlled by the CSM at a central server or node. The web-bots should also have the capability to instantaneously adapt their functions upon receiving signals from the CSM of ongoing changes in the simulation that may affect the nature of the input data required. In other words, they should be programmable to perform different data-gathering functions "on the fly". Further, they should have the capability to send and receive messages to the CSM server and to each other to adapt and coordinate the overall data gathering functions they are performing on the global network Such a system of autonomous data handlers is disclosed is U.S. Pat. No. 6,282,697 to W. Fables and J. Park, inventors in common herewith, which is incorporated in its entirety by reference herein. The network data processing system employs a plurality of software entities (referred to herein as "molecules") which can be dynamically configured to process data autonomously on any computing resource in a network. The molecules can send and receive signals indicating the state of a molecule, whether or not a processing task is fulfilled, the results of a processing task, and whether or not the operation of a molecule is to be terminated, interrupted, reconfigured, or continued by creation of one or more "next" molecules. The molecules are created from a common set of software micro-components, which may be programmed in any programming languages to run in any operating system environments.

The molecules are ideally suited to be deployed with distributed computing resources of diverse networks. The molecules may be programmed or adapted on the fly to the programming language or data framework of the computing resources to which they are assigned. The molecules can receive and send signals to a central server and to each other and send and receive data using common network protocols. They operate to complete their respective data processing tasks autonomously until the overall data processing task is completed. A data gathering task can be performed on the global network by deploying the molecules and adapting their functions and interactions in a "logic web" which is dynamically configured to fulfill the task Complex computational and data processing tasks can be performed by deploying logic webs of suitable component molecules utilizing any available computing resources with any information source on the network. Thus, for example, a logic web can be designed with molecules to gather data from many different legacy database systems, with applications programmed in different languages, and with data of any type stored in any format. The CSM can thus be readily deployed to run simulations on global networks using such logic webs of autonomous data handlers.

INDUSTRIAL APPLICABILITY

The Cultural Simulation Model of the present invention can thus be used to run sophisticated simulation models that simulate human behavior using software-modeled agents. Agents can be programmed based on the cultural, social, and behavioral tenets underlying their perception of and responses to real-world information reflecting ever-changing real-world conditions. The CSM extracts and utilizes raw data from diverse information sources for use in the simulations, including live information feeds, as well as enduring and historical data. Simulations can be run using a society of agents selected from pre-programmed libraries of agent types. Simulations can be run in real time by deploying the CSM with autonomous data handlers on global networks.

At each level of implementation, new and unique capabilities are provided by the invention. Large pools of live data can be extracted from diverse sources, cultures, languages, organizations, and events, and integrated and dynamically assigned for use in the CSM. Modeling of samples of diverse data sources will allow libraries of associative matrix maps to be created and evolve for diverse agent types, data sources, and data types. Simulations can be run on global networks including the internet for agent types of different cultures, societies, and behaviors, with global sources of information. Simulation environments can include problems and situations in businesses, human resources, competitive markets, consumer behavior, economic policy, political dynamics, social networks, education, cultural support, planning, urban development, crime prevention, social modeling, interactive gaming, etc. The simulation data visualization methods provide robust new visual tools for pattern extraction, trend analysis, network analysis, multicultural analysis, profiling, anticipation etc.

Interactive gaming is a typical example application of this system. Live data input and immediate and local context or situational influence on the game play are the novel contributions of our technology. This can be live data updating the situation or in the game example the current situation such as which agents are in the current view create opportunity available to the simulation that can be used to create new structure and options to the agents and players allowing the system to create a non repeating game.

Unlike a typical simulation where all possibilities are pre determined or variables are set that essentially determine the outcome, this system allows for unanticipated results to occur based on culturally specific traits, making it useful for simulating future events and anticipating the likelihood of particular events occurring without setting them.

While certain preferred embodiments and methods have been described above, it is to be understood that many modifications and variations may be devised given the above description of the principles of the invention. It is intended that all such modifications and variations be considered as within the spirit and scope of this invention, as it is defined in the following claims.

This also relates to normalizing the language in the text system to include culturally specific vocabulary which can occur on a per source basis.

Samples of word entries and language default dictionaries making up an agent's behavioral expression are illustrated in Table I for the example of a Marketing VP agent. The Marketing VP agent's expression is modeled for response to news and company reports (Scale 7), filtered through the company's goals and corporate culture (Scale 8), tempered by his/her personal beliefs or values (Scale 9), taken in view of the current status of the marketing department (Scale 4) and relationship to other departments within the company (Scale 5), resulting in a response to taking action on a company marketing plan (Scale 3). Within each scale, keyword entries are ordered in Levels from 10 to 1 of most abstract to least abstract. Each keyword entry is also assigned a Degree weighting from 10 to 1 of most influence to least influence (not shown, described further below). The modeled Marketing VP agent would thus respond to input information as follows. Input Data to the agent include global business news, company marketing plans, company reports, and intra-company email, shown at the initial Scale 7 in this example. Keywords for "long term company goals", "marketing goals, marketing department", or "marketing methods" found in the input text from these sources causes progression to Scale 8 in the agent's behavioral expression. Further keywords for "personal integrity", "personal honesty", "customer loyalty", or "company survival" found in the input text from these sources cause progression to Scale 9. In a similar manner, further keywords found reflecting the current status of the marketing department cause progression to Scale 4, and keywords reflecting relationships to other departments within the company cause progression to Scale 5. Finally, when the progression through the prior layers has been fulfilled, further keywords found in the input text reflecting any elements of taking action on a company marketing plan cause progression to the final Scale 3. The traversal time and the number and influence degrees of keyword entries at the final Scale 3 are indicative of the agent's response to the input information. A quick traversal with multiple keywords of high degree found reaching applicability across diverse information sources and through different layers of agent perception. Homonyms, synonyms, word or phrase equivalents, and equivalent translated terms can be similarly modeled for an agent. In a similar fashion of determining meaning from use, novel phrases, slang and abstraction expression is defined within the contextual use by the agents and the live data feeds.

An agent behavioral expression can therefore be efficiently programmed in the form of encoded entries of keywords deemed likely to have influence on an agent behavioral expression. The keywords are assigned to the different scales of influence on the agent's perception. Each scale is graded into "levels" of resolution (10 levels used in this implementation example), ranging from most abstract to least abstract. Each level can be further differentiated in qualitative or quantitative ways, such as by weighting in "degree" (10 used in this implementation example), ranging from "most influence" to "least influence". The 10-degree and 10-level gradations increase the resolution of each scale by a factor of 100. Entries of any scale/level/degree may be linked to other entries in other scales/levels/degrees based on any perceptual associations deemed to be characteristic of that agent's behavioral expression, determined by experts or determined by use within the sim.

Degree can be used to weight an influence, and it can also contain a scale-specific parameter such as a qualitative state, an image or gesture, for example, that is used to define, describe and refine the level and scale. Additional parameters can be attached as required, for example, conventional quantitative variables with a value may be used. If still more resolution of detail is required, then fine-grained sensitivity levels can be used. The sensitivity level is treated as a different parameter. It can be used to adjust the link to the particular live data source. For example, if a link reacts to a data source so frequently that its activation by that data source has questionable meaning, the sensitivity can be turned down so that only an increase over normal occurrence is noticed. In other words, it is a way to normalize the links.

We claim:

1. A data visualization method for use in a computer simulation of response of a computerized agent archetype of behavioral expression to real-world input data, comprising:

(a) modeling the behavioral expression of an agent as an archetype of behavioral characteristics corresponding to likely responses to real-world input data as measured across a plurality of predetermined scales of agent perception, (i) wherein said scales represent respective pre-defined behavioral modalities of agent perception across a given perceptual range;

(ii) wherein each of said scales is graded into a plurality of levels of resolution ranging from most abstract to the agent to least abstract to the agent;

(iii) wherein said agent archetypal behavioral expression is modeled as an expected progression in sequence across a selected series of scales according to a particular mode of progression uniquely representing the agent's archetypal behavior, and includes an associative data matrix comprising a list of keywords for each scale of the selected series of scales that are deemed likely to have an influence on the agent's archetype of perception on each such scale of perception, and each keyword of the list for each scale being rated for a level of resolution on which the keyword is deemed likely to have an influence on the agent's perception on that scale;

(b) running a computer simulation of an agent's modeled behavioral expression against input text data from real-world information sources, and tracking the numbers and levels of matches of keywords in the input text data to the associative data matrix of keywords for the chosen series of scales, and (c) providing a visual display of a pattern of responses of the agent's archetype of behavioral expression using the numbers and levels of keyword matches and their progression in the selected series of scales as a visualization of computer simulation data uniquely representing the response of the agent's archetype of behavioral expression to the real-world input data, wherein said plurality of scales of agent perception is defined across a perceptual (1) range of most internal to the agent to most external to the agent; (2) range of smallest area of agent perception to largest are of agent perception; and (3) range of most temporal to the agent to most enduring to the agent.

2. A data visualization method according to claim 1, wherein the real-world input data include data from one or more real-world information sources of the group consisting of: news sources; broadcast media; communications and interactions between participants; publicly available information; information sources available to selected agents; information sources available to selected organizations; analyst reports; reviews; search data; general literature; movies; images; sound; and other human perceptual data.

3. A data visualization method according to claim 1, wherein the agent archetype selected to be run in a computer simulation includes one or more agent types from the group consisting of: member of an organization; position within an organization; leader or node within an organization; follower within an organization; competitor to an organization; enduring influence in a given cultural environment; domain knowledge in a given cultural environment; terrain knowledge in a given cultural environment; society; organization; and institution.

4. A data visualization method according to claim 1, wherein the agent's archetype of behavioral expression is defined in terms of expected agent behavioral responses to keywords expected to be encountered in real-world text data from a given information source.

5. A data visualization method according to claim 1, wherein for each scale the levels of resolution are defined according to levels of intensity of expected agent responses.

6. data visualization method according to claim 5, wherein each level is graded according to a plurality of degrees of influence of agent responses.

7. A data visualization method according to claim 1, wherein a computer simulation proceeds by filtering the real-world input data for keywords matching those of the associative data matrix, and the matched keywords are tracked as a progression across the selected series of scales by linking keyword matches across scales.

8. A data visualization method for use in a computer simulation of response of a computerized agent archetype of behavioral expression to real-world input data, comprising:

(a) modeling the behavioral expression of an agent as an archetype of behavioral characteristics corresponding to likely responses to real-world input data as measured across a plurality of predetermined scales of agent perception, (i) wherein said scales represent respective pre-defined behavioral modalities of agent perception across a given perceptual range;

(ii) wherein each of said scales is graded into a plurality of levels of resolution ranging from most abstract to the agent to least abstract to the agent;

(iii) wherein said agent archetypal behavioral expression is modeled as an expected progression in sequence across a selected series of scales according to a particular mode of progression uniquely representing the agent's archetypal behavior, and includes an associative data matrix comprising a list of keywords for each scale of the selected series of scales that are deemed likely to have an influence on the agent's archetype of perception on each such scale of perception, and each keyword of the list for each scale being rated for a level of resolution on which the keyword is deemed likely to have an influence on the agent's perception on that scale;

(b) running a computer simulation of an agent's modeled behavioral expression against input text data from real-world information sources, and tracking the numbers and levels of matches of keywords in the input text data to the associative data matrix of keywords for the chosen series of scales, and (c) providing a visual display of a pattern of responses of the agent's archetype of behavioral expression using the numbers and levels of keyword matches and their progression in the selected series of scales as a visualization of computer simulation data uniquely representing the response of the agent's archetype of behavioral expression to the real-world input data, wherein said plurality of scales of agent perception includes one or more scales of the group consisting of:

Scale of agent's consciousness or awareness of information that may be of interest;

Scale of agent's navigation patterns, including the impulse to move in a particular direction, emotional patterns of the agent, or modes of categorizing and assigning labels to information items;

Scale of agent's actions and reactions (including emotions) or intuition on a sense level to information;

Scale of information mulling modes by which the agent retains a reservoir of information minutia and creates associations between information items;

Scale of agent's employment of personal information filters and contextual memory for extracting meaning based on the agent's experience, and the roles they play;

Scale of agent's employment of culturally-based filters, environmental assumptions and conditions, and/or social influences to extract meaning from information items;

Scale of agent's learned modes of extracting meaning from externally presented information through media channels, news of events, images and portraits, current priorities, and other external phenomena, that may cause them to put medium or long term processes into effect or influence a particular response as typical;

Scale of agent's learned or enduring knowledge of the environment he/she is involved in, its history, and its trends into the future;

Scale of agent's complex of deeply held beliefs (including religion) and cultural or archetypal values; and Scale of agent's world view or overriding ethos through which all things, from the cosmos down to abstract minutia, are perceived.

9. A data visualization method for use in a computer simulation of response of a computerized agent archetype of behavioral expression to real-world input data, comprising:

(a) modeling the behavioral expression of an agent as an archetype of behavioral characteristics corresponding to likely responses to real-world input data as measured across a plurality of predetermined scales of agent perception, (i) wherein said scales represent respective pre-defined behavioral modalities of agent perception across a given perceptual range:

(ii) wherein each of said scales is graded into a plurality of levels of resolution ranging from most abstract to the agent to least abstract to the agent;

(iii) wherein said agent archetypal behavioral expression is modeled as an expected progression in sequence across a selected series of scales according to a particular mode of progression uniquely representing the agent's archetypal behavior, and includes an associative data matrix comprising a list of keywords for each scale of the selected series of scales that are deemed likely to have an influence on the agent's archetype of perception on each such scale of perception, and each keyword of the list for each scale being rated for a level of resolution on which the keyword is deemed likely to have an influence on the agent's perception on that scale;

(b) running a computer simulation of an agent's modeled behavioral expression against input text data from real-world information sources, and tracking the numbers and levels of matches of keywords in the input text data to the associative data matrix of keywords for the chosen series of scales, and (c) providing a visual display of a pattern of responses of the agent's archetype of behavioral expression using the numbers and levels of keyword matches and their progression in the selected series of scales as a visualization of computer simulation data uniquely representing the response of the agent's archetype of behavioral expression to the real-world input data, wherein the visual display is one of the group consisting of:

(i) a waveform chart displaying the frequency of keyword matches of the input text;

(ii) a star chart displaying patterns of traversal of keyword matches across the chosen series of scales for anent behavioral expression in response to the input text;

(iii) a grid chart displaying the patterns of traversal of keyword matches across the chosen series of scales for anent behavioral expression in response to the input text;

(iv) a pole chart displaying the patterns of traversal of keyword matches across the chosen series of scales for agent behavioral expression in response to the input text.

10. A data visualization display from a computer simulation of response of a computerized agent archetype of behavioral expression to real-world input data, comprising:

a visual display of a pattern of responses of the agent's archetype of behavioral expression to keyword matches and their progression in a selected series of scales of agent perception uniquely representing the response of the agent's archetype of behavioral expression to the real-world input data, (a) wherein said scales represent respective pre-defined behavioral modalities of agent perception across a given perceptual range;

(b) wherein each of said scales is graded into a plurality of levels of resolution ranging from most abstract to the agent to least abstract to the agent;

(c) wherein said agent archetypal behavioral expression is modeled as an expected progression in sequence across a selected series of scales according to a particular mode of progression uniquely representing the agent's archetypal behavior, and includes an associative data matrix comprising a list of keywords for each scale of the selected series of scales that are deemed likely to have an influence on the agent's archetype of perception on each such scale of perception, and each keyword of the list for each scale being rated for a level of resolution on which the keyword is deemed likely to have an influence on the agent's perception on that scale; and (d) wherein said visual display of the pattern of responses of the agent's archetype of behavioral expression is derived from a computer simulation of the agent's modeled behavioral expression to input text data from real-world information sources, and is one of the group consisting of:

(i) a waveform chart displaying the frequency of keyword matches of the input text;

(ii) a star chart displaying patterns of traversal of keyword matches across the chosen series of scales for agent behavioral expression in response to the input text;

(iii) a grid chart displaying the patterns of traversal of keyword matches across the chosen series of scales for agent behavioral expression in response to the input text;

(iv) a pole chart displaying the patterns of traversal of keyword matches across the chosen series of scales for agent behavioral expression in response to the input text.

11. A data visualization display according to claim 10, wherein said visual display is a pole chart which comprises a series of vertical poles representing the selected series of scales, and the levels of resolution are defined in increments spanning each vertical pole, and the markers are horizontal segments positioned across a range of left-right positions on any given level of a vertical pole corresponding to frequency of keyword matches on each such level, whereby said vertical poles and horizontal marker segments provide a visual display of a behavioral DNA chart.

* * * * *